April 7, 1953  A. RACEK ET AL  2,633,725
PYROPHORIC LIGHTER
Filed Jan. 11, 1951
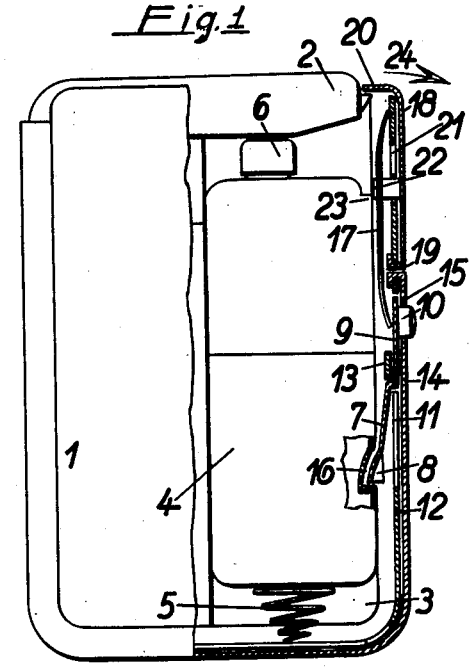
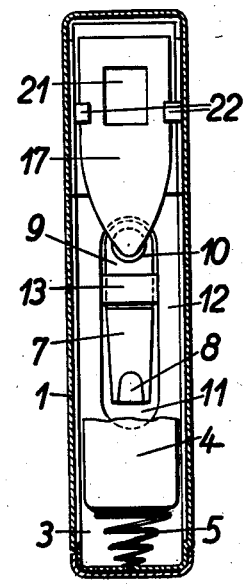
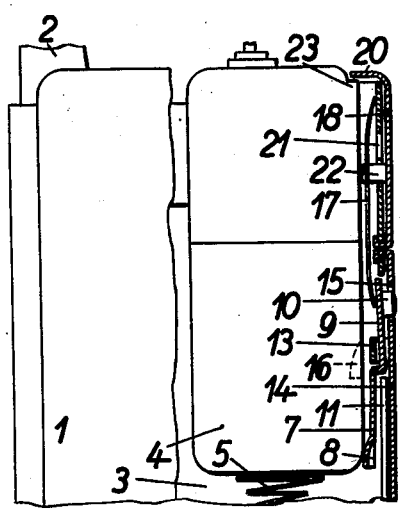
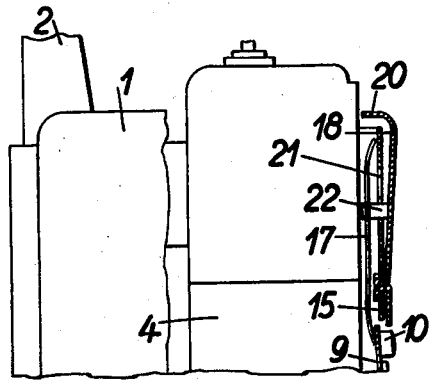
INVENTORS
ALFRED RACEK &
JOHANN RAGANITSCH
BY
ATTORNEY Patented Apr. 7, 1953

2,633,725

UNITED STATES PATENT OFFICE 2,633,725

PYROPHORIC LIGHTER

Alfred Racek and Johann Raganitsch,
Vienna, Austria

Application January 11, 1951, Serial No. 205,467
In Austria February 16, 1950

7 Claims. (Cl. 67—7.1)

This invention relates to a pyrophoric lighter which comprises a fuel tank which is adjustable in the casing, and means for locking said fuel tank in the casing in at least two positions for use.

Lighters are known the fuel tank of which is guided by means of a peg in a longitudinal slot in the casing. The tank has to be moved and locked with the fingers, the tank being secured in its several positions for use by rests and resilient catches. Moreover, it has been suggested, in conjunction with lighters having a divided fuel tank, to adjust only the wick container in the lighter casing to any of two altitudes, by means of a button protruding through a slot in the casing. It is also possible to use a spring, which can be released by the button, for pressing the wick container upwardly. In this known lighter, however, the wick container cannot be removed out of the casing. In another known lighter the fuel tank is movable, together with the friction wheel carrier, in the casing, and the friction wheel carrier can be pushed partially out of the casing under the pressure exercised by a spring, e. g., by the flint spring, after a locking button has been depressed. A driver peg transmits this slide movement to the fuel tank. Such a coupling of two components of the lighter, however, impairs the functional safety of the lighter.

This invention relates to a pyrophoric lighter of the type described hereinbefore, in which the fuel tank, consisting of a unitary body which is closed on all sides, is freely slidable in and out of the lighter casing, said tank being subjected to the influence of a spring arranged between the casing bottom and the tank bottom, and to the influence of at least one locking means which is urged by spring force transversely into the guide path of the tank and can be moved out of said path.

The guidance of the fuel tank in the casing and its locking means permit of a convenient adjustment of the tank to the desired position for use, by means of the spring, and of the removal of the whole tank out of the casing while the flame is burning.

A lighter embodying this invention is shown by way of example in the accompanying drawings, in which Fig. 1 is a partially sectional side elevation showing the lighter in the condition for non-use, Fig. 2 a sectional end view taken through the casing and showing the locking means, seen from the inside, Fig. 3 a partially sectional side elevation showing the lighter with its fuel tank in the upper position for use, and Fig. 4 a partially sectional side elevation showing a portion of the casing and of the tank, which latter partially protrudes out of the casing and is exposed for being pulled out.

The casing 1, which can be closed by a spring-loaded cover 2, has a guide space 3 for the fuel tank 4, which is easily slidable in the casing. One end of a coil spring 5, which is wound in the shape of a cone for space economy, is fixed to the casing bottom. The other end of said spring bears against the bottom of the tank 4 and permanently urges it upwardly. The lighter casing 1 is provided with a manually operable locking means, which enables the locking of the fuel tank in at least one position for use. For this purpose one of the narrow side walls of the casing 1 carries a pivotable, two-armed trigger lever, one arm 7 of which has a nose-shaped projection 8 whereas a push button 10 is provided at the other arm 9 of said lever. The trigger lever 7, 9 is arranged in a cutting-out 11 of an internal casing wall 12. A transverse web 13, bridging the cutting-out 11 and being somewhat depressed inwardly, serves as an engaging piece for the trigger lever, which has a central cranked portion. The lever arm 9 lies between the transverse web 13 and an external casing wall 14 and is secured against longitudinal displacement by the outwardly protruding push button 10, which is fitted in an aperture 15 provided in the wall 14. The other lever arm 7 is bent inwardly in such a manner that its projection 8 interlocks with a recess 16 impressed into the fuel tank 4. A leaf spring 17 urges with its lower end the trigger lever 7, 9 into its locking position.

Above the trigger lever 7, 9, a one-armed lever 18, for locking the cover 2, is provided adjacent to the top portion of the narrow side wall 12 of the casing. This lever 18 is mounted to the casing wall 12 by means of fixing lugs 19, which permit of a small pivotal movement of the lever 18. The top flange 20 of the lever 18 locks the cover 2 in its closed position. Two inwardly bent lugs 22 of the lever 18 protrude through an aperture 21 of the casing wall 12 and embrace the leaf spring 17, the top end of which bears against the casing wall and urges by means of the lugs 22 the lever 18 against the casing wall 12. A nose-shaped projection 23 is provided at the top end of the fuel tank 4 and is adapted to engage with the locking flange 20 of the lever 18.

For releasing the spring-loaded cover, the lever 18 must be deflected in the sense of the arrow 24. Being lifted thereby, the wick cap 6 releases the fuel tank 4, which is then forced somewhat upwardly by the spring 5 until the lower edge of the recess 16 engages with the projection 8. The wick, which upon the opening of the cover is inflamed as a result of the action of the friction wheel, will now burn within the windshield jacket when the fuel tank is in its lowermost position for use. When it is desired, for other uses, that the flame should be freely accessible, the tank 4 can be caused to move to another, higher position (Fig. 3) by a depression of the button 10. Thereby the projection 8 of the trigger lever 7, 9 comes out of the path of movement of the tank 4, which is pushed upwardly by the spring 5 until its projection 23 engages with the locking flange 20 of the lever 18. For lighting a pipe, e. g., the fuel tank, with the flame still burning, may even be pulled entirely out of the casing. For this purpose the lever 18 must be deflected once more in the sense of the arrow 24, so that the projection 23 is released and the tank 4 is pushed out of the casing until the spring 5 has relaxed. Now the tank can conveniently be taken with the fingers and pulled out entirely (Fig. 4). After use the tank 4 is inserted back into the casing and pressed at least down to its upper position for use. Subsequently the tank is automatically depressed into its lowermost position by the wick cap 6 as the cover 2 is being closed. In conjunction with the sloping upper portion of the recess 16, the nose-shaped projection 8 on the arm 7 of the trigger lever permits of the passage of the tank beyond its lower position for use.

In the closed lighter, the distance from the lower rim of the wick cap 6 to the engaging surface of the projection 8 is smaller than the distance from said lower rim to the engaging surface of the recess 16, both distances being measured in the direction of movement of the tank. Hence, when the lighter is closed by the cover 2, the tank 4 will be held against the pressure of the spring 5 only by the wick cap 6, fixed to the cover, so that a permanently effective seal of the wick is ensured.

What we claim is:

1. A pyrophoric lighter which comprises a casing, a unitary fuel tank closed on all sides which is slidable in and upwardly out of said casing, a spring between the casing bottom and the fuel tank bottom, for urging the tank upwardly, two retractable locking means protruding at different levels into the path of the tank for locking it in two lighting positions, operating means operatively disconnected from each of said locking means and operable to release the tank, and spring means resiliently bearing against both said locking means to urge them into their respective locking positions.

2. A pyrophoric lighter which comprises a casing, a unitary fuel tank closed on all sides which is slidable in and upwardly out of said casing, a spring between the casing bottom and the fuel tank bottom, for urging the fuel tank upwardly, retractable locking means protruding into the path of the tank to lock it in a lower lighting position, an engaging surface at the tank, a cover, cover locking means protruding into the path of said engaging surface of the tank to lock the tank in a higher lighting position, operating means operatively disconnected from each other for each of said locking means and operable to release the tank, and spring means resiliently bearing against both said locking means to urge them into their respective locking positions.

3. A pyrophoric lighter which comprises a casing, a unitary fuel tank closed on all sides and slidable in and upwardly out of said casing, a spring between the casing bottom and the fuel tank bottom, for urging the fuel tank upwardly, two retractable locking means protruding at different levels into the path of the fuel tank for locking it in two lighting positions, operating means operatively disconnected from each other for each of said locking means and operable to release the tank, and a leaf spring which resiliently bears with one end on one of said locking means, with a central portion on the other locking means, to urge both said locking means into their respective locking positions, and with another end bears on the lighter casing.

4. A pyrophoric lighter which comprises a casing, a unitary fuel tank closed on all sides which is slidable in and upwardly out of said casing, a spring between the casing bottom and the fuel tank bottom, for urging the fuel tank upwardly, retractable locking means protruding into the path of the tank to lock it in a lower lighting position, an engaging surface at the tank, a cover, cover locking means protruding into the path of said engaging surface of the tank to lock the tank in a higher lighting position, operating means operatively disconnected from each other for each of said locking means and operable to release the tank, and a leaf spring which resiliently bears with one end on said retractable locking means and with a central portion on said cover locking means to urge them into their respective locking positions, and with another end bears on the lighter casing.

5. A pyrophoric lighter which comprises a casing, a unitary fuel tank closed on all sides which is slidable in and upwardly out of said casing, a spring between the casing bottom and the fuel tank bottom, for urging the fuel tank upwardly, a recess in said tank, said recess having an inwardly sloping upper surface and an engaging surface, retractable locking means comprising a nose having a lower locking surface and an upper surface sloping in the direction toward said recess, said locking means being movable into a locking position in which said locking surface engages said engaging surface to prevent upward movement of the tank beyond a lower lighting position, and said upper surfaces of the nose and recess being adapted to slidingly engage each other to permit of a downward movement of said tank beyond said lower lighting position, locking means protruding into the path of the tank for locking it in a higher lighting position, operating means operatively disconnected from each other for each of said locking means and operable to release the tank, and spring means resiliently bearing against both said locking means to urge them into their respective locking positions.

6. A pyrophoric lighter which comprises a casing, a unitary fuel tank closed on all sides which is slidable in and upwardly out of said casing, a spring between the casing bottom and the fuel tank bottom, for urging the fuel tank upwardly, a recess in said tank, said recess having an inwardly sloping upper surface and an engaging surface, retractable locking means comprising a nose having a lower locking surface and an upper surface sloping in the direction toward said recess, said locking means being movable into a locking position in which said locking surface engages with said engaging surface to prevent upward movement of the tank beyond a lower lighting position, and said upper surfaces of the nose and recess being adapted to slidingly engage each other to permit of a downward movement of said tank beyond said lower lighting position, locking means protruding into the path of the tank for locking it in a higher lighting position, operating means operatively disconnected from each other for each of said locking means and operable to release the tank, spring means resiliently bearing against both said locking means to urge them into their respective locking positions, a cover, and a wick cap adapted to engage with its lower edge the top of said tank when the cover is closed, the distance from said lower edge to the locking surface of said nose being smaller than the distance from said lower edge to said engaging surface of the recess, when the cover is closed, both directions being measured in the direction of movement of the tank.

7. A pyrophoric lighter which comprises a casing, a unitary fuel tank closed on all sides which is slidable in and upwardly out of said casing, a spring between the casing bottom and the tank bottom, for urging the tank upwardly, a transverse web at the casing, an aperture in the casing, a trigger lever having two lever arms and a central cranked portion pivotally mounted at said transverse web, one of said lever arms having a nose shaped projection protruding in a locking position of the trigger lever into the path of the fuel tank for locking the tank in a lower lighting position, the other lever arm having a push button protruding outwardly through said aperture and fitting the trigger lever against longitudinal movement, locking means protruding into the path of said tank to lock the tank in a higher lighting position, operating means operatively disconnected from said trigger lever and operable to release the tank out of said higher lighting position, and spring means resiliently bearing against said trigger lever and said locking means to urge them into their respective locking positions.

ALFRED RACEK.
JOHANN RAGANITSCH.

REFERENCES CITED

The following references are of record in the file of this patent:

UNITED STATES PATENTS

| Number | Name | Date |
| --- | --- | --- |
| 1,845,340 | Ritz Woller | Feb. 16, 1932 |
| 2,001,464 | Kerr | May 14, 1935 |

FOREIGN PATENTS

| Number | Country | Date |
| --- | --- | --- |
| 486,881 | Germany | Apr. 18, 1929 |
| 739,640 | France | Jan. 14, 1933 |